United States Patent [19]

Cooke et al.

[11] Patent Number: 4,631,557

[45] **Date of Patent: * Dec. 23, 1986**

[54] INK JET EMPLOYING PHASE CHANGE INK AND METHOD OF OPERATION

[75] Inventors: Theodore M. Cooke, Danbury; William J. DeBonte, Kent, both of Conn.

[73] Assignee: Exxon Printing Systems, Inc., Brookfield, Conn.

[ * ] Notice: The portion of the term of this patent subsequent to Sep. 3, 2002 has been disclaimed.

[21] Appl. No.: 660,656

[22] Filed: Oct. 15, 1984

[51] Int. Cl.[4] .......... G01D 15/16

[52] U.S. Cl. .......... 346/140 R; 400/126

[58] Field of Search .......... 346/140 PD, 140 R, 1.1; 400/126; 106/20, 30, 31

[56] References Cited

U.S. PATENT DOCUMENTS

| | | | |
|---|---|---|---|
| 3,653,932 | 4/1972 | Berry et al. | 346/140 PD X |
| 4,215,352 | 7/1980 | Corwin | 346/140 R |
| 4,238,807 | 12/1980 | Bovio | 346/140 PD |
| 4,320,406 | 3/1982 | Heinzl | 346/140 PD |
| 4,392,146 | 7/1983 | Bovio | 346/140 PD |
| 4,462,035 | 7/1984 | Koto | 346/76 |
| 4,539,568 | 9/1985 | Lewis | 346/140 PD |

FOREIGN PATENT DOCUMENTS

| | | |
|---|---|---|
| 0097823 | 1/1984 | European Pat. Off. . |
| 53128053 | 4/1980 | Japan . |

*Primary Examiner*—E. A. Goldberg

*Assistant Examiner*—Mark Reinhart

[57] ABSTRACT

A demand ink jet employs removable cartridges of hot melt ink. When the temperature of the ink within the cartridge is raised, the ink melts and drains from the cartridge into the supply system. Each of the cartridges may include ink of a different color so as to permit multi-color printing.

61 Claims, 4 Drawing Figures

INK JET EMPLOYING PHASE CHANGE INK AND METHOD OF OPERATION

BACKGROUND OF THE INVENTION

This invention relates to an ink jet wherein the ink employed with the jet is of the phase change type which may be referred to as hot melt ink.

A phase change or hot melt ink of the type utilized in an ink jet is characteristically solid at room temperature. When heated, the ink will melt to a consistency so as to be jettable. A hot melt ink jet apparatus and method of operation are disclosed in copending application Ser. No. 610,627, filed May 16, 1984, which is assigned to the assignee of this invention. The hot melt ink may be jetted from a variety of apparatus including those disclosed in the aforesaid copending application.

When employing ink in a liquid state, the delivery of the ink is, of course, dictated by the liquid state. Typically, the ink is contained within a closed vessel of some sort prior to delivery to the ink jet. When employing the hot melt ink, the solid state nature of the ink suggests different ink delivery techniques.

SUMMARY OF THE INVENTION

It is an object of this invention to provide a hot melt ink delivery system wherein handling of the ink is minimized.

It is a further object of this invention to provide a hot melt ink delivery system wherein the ink may be easily supplied to the ink jet apparatus.

It is a further object of this invention to provide a hot melt ink delivery system which leads itself to use in an array of ink jets.

It is a still further object of this invention to provide an ink delivery system which may employ different colors of ink in an array of ink jets.

It is a still further object of this invention to provide an ink jet apparatus wherein the conduction of heat to the ink in the system is facilitated.

In accordance with these and other objects of the invention, ink is delivered to the apparatus in the form of at least one preformed block of ink in solid state. The ink is then melted so as to change the ink from a solid state to a liquid state. The ink in a liquid state is supplied to the ink jet and droplets of ink are ejected from the ink jet.

In accordance with one aspect of the invention, each block of ink is mounted in a cartridge. The cartridge may then be inserted into a suitable receptacle. The cartridge receptacle may be provided with threads for threaded engagement.

In a particularly preferred embodiment of the invention, the ink jet apparatus comprises a plurality of ink jets and a plurality of blocks. In a preferred embodiment of the invention, each block is mounted in a cartridge which in turn supplies a different plurality of jets.

In accordance with another important aspect of the invention, the ink is melted and then drains from the cartridge to create a head. As a result, the ink flows from the location of the cartridge where it melts to a supply location where it is maintained in a liquid state in readiness for one or more ink jets.

In accordance with another important aspect of the invention, there is no substantial temperature gradient between the melting location and the supply location. This is accomplished by utilizing conducting material such that the heat is substantially uniformly conducted from the heater to the melting location and the supply location. Preferably, the heat is provided by a plate-like heating element for conducting heat to the cartridge, the reservoir, the ink transfer flow path and the ink jet.

DETAILED DESCRIPTION OF A PREFERRED EMBODIMENT

Figure 1:
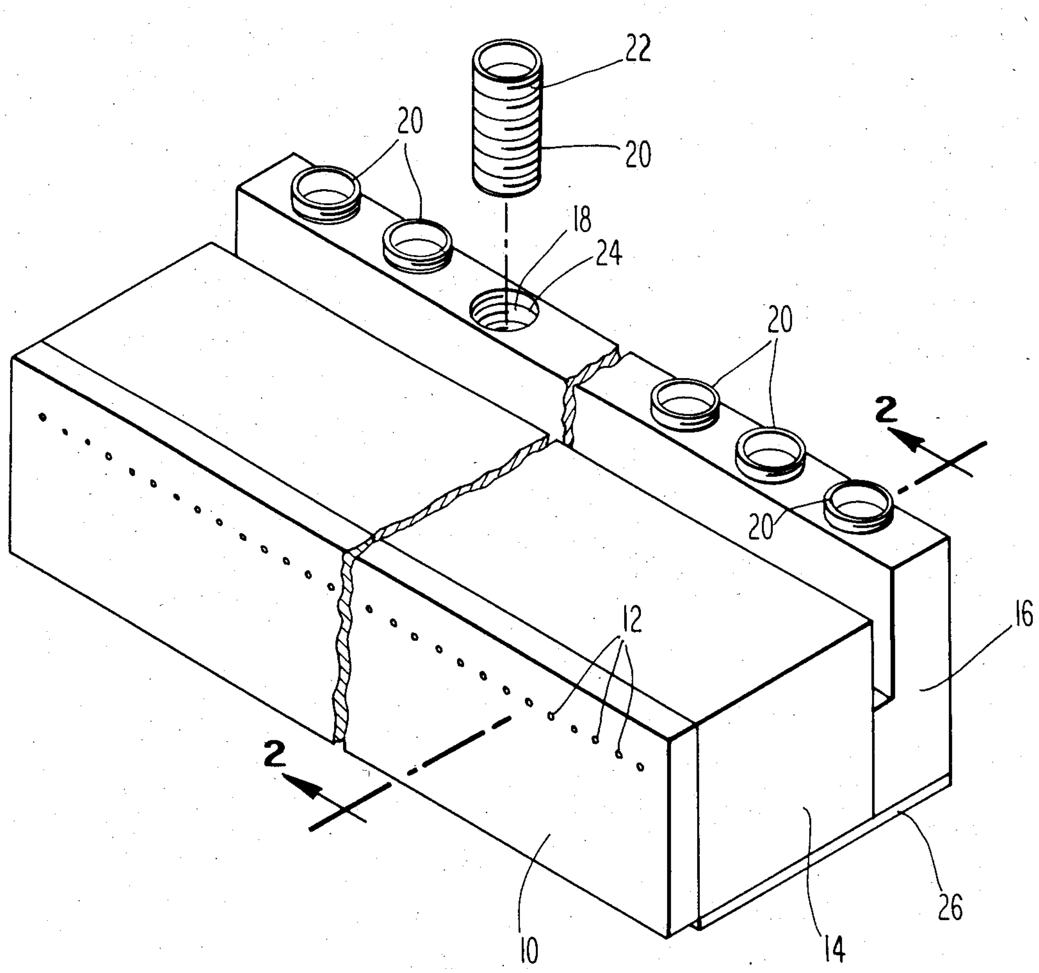
FIG. 1 is a perspective view of an ink jet apparatus constructed in accordance with this invention.

Referring to FIG. 1, a demand ink jet apparatus is disclosed comprising a chamber plate 10 having an array of orifices 12 for ejecting droplets of ink. An intermediate plate 14 is located between the chamber plate 12 and an ink supply plate 16.

In accordance with one important aspect of the invention, the supply plate 16 includes receptacles 18 which receive cylindrical cartridges 20. The receptacles 18 include threads 22 which mate with threads 24 in the receptacle 18 for engaging and securing the cartridges 20 in place.

In accordance with another important aspect of the invention, the ink within the cartridges 20 is maintained in a solid state in a substantially cylindrical block form prior to insertion into the receptacles 18. After insertion, the block of solid state ink within the cartridge 20 is heated so as to permit the ink to flow from the cartridge 20 which serves as a melting location to the ink jets including the chambers housed within the plate 10. This heating is accomplished, in accordance with one important aspect of this invention, by a heating plate 26 which is thermally coupled to and located below the chamber plate 10, the intermediate plate 14 and the supply plate 16.

Figure 2:
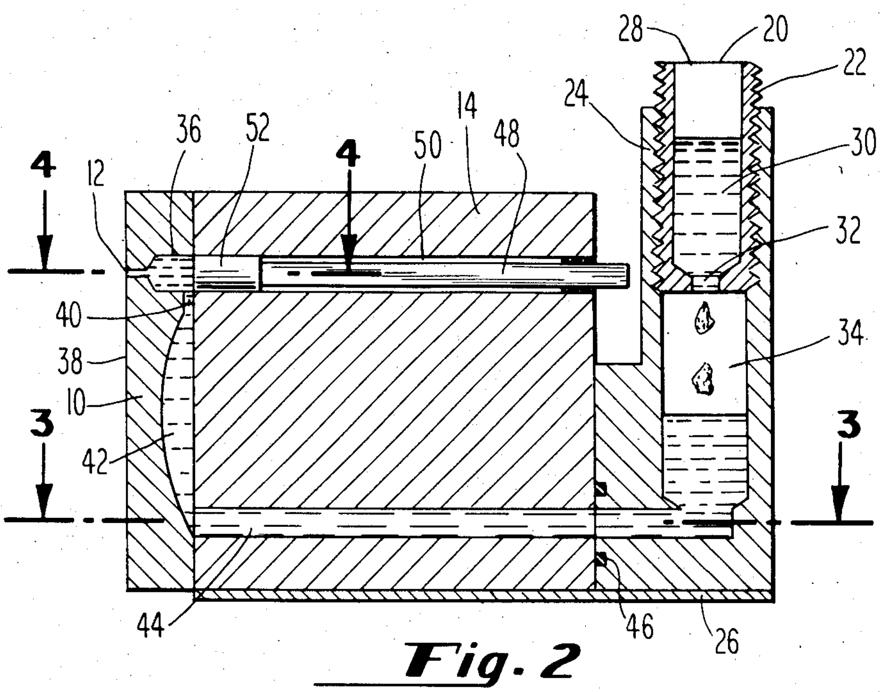
FIG. 2 is a sectional view of the apparatus of FIG. 1 taken along line 2—2.

Reference will now be made to FIG. 2 for a fuller explanation of the ink supply system as well as the ink jet. Each cartridge 20 which is essentially tubular but partially closed to form a cup has an open end 28 so as to permit the filling of the cartridge 20 with ink 30. As shown in FIG. 2, the ink 30 has undergone a phase change by virtue of the heating supplied by the plate 26. However, prior to heating, the ink 30 was in the solid state such that ink would not flow or drip from an opening 32 in the bottom of the cup-like cartridge. Once the heating of the cartridge 20 takes place to a point above the melting point of the ink 30, the ink 30 becomes sufficiently liquid so as to drain into a reservoir column 34 by virtue of gravity flow.

Referring again to FIG. 2, details of the chamber plate 10 are disclosed. The chamber plate 10 includes a plurality of chambers 36 having orifices 12 communicating with the face 38 of the plate 10. Each chamber 36 has an inlet opening 40 which is supplied from a dish-shaped plenum 42. The ink in the plenum 42 is supplied from the reservoir 34 by an ink flow transfer path 44 which extends through the intermediate plate 14.

As will be appreciated from FIG. 2, by utilizing a heat conductive material for the plates 10, 14 and 16, the temperature throughout the ink travel path may be made substantially constant, i.e., there is very little temperature gradient across the device from the melting location in the cartridge 20 through the supply location to the chamber 36. Suitable heat conductive materials which may be employed for the plates 10, 14 and 16 include but are not limited to stainless steel, copper and aluminum as disclosed in copending application Ser. No. 661,924, filed Oct. 17, 1984, which is assigned to the assignee of this invention and incorporated herein by reference. All such materials assure the conducting of heat in a substantially uniform way to all locations of ink. It may also be desirable to provide for separate heating of the ink supply and the jets are disclosed in copending application Ser. No. 661,029, filed Oct. 15, 1984, which is assigned to the assignee of this invention and incorporated herein by reference.

In accordance with another important aspect of the invention, it will be appreciated that the ink flow transfer path 44 is relatively short and that the entire structure, although comprising separate plates, has been integrated. This assures that the temperature at all locations will be substantially uniform and minimizes the risk of an ink freeze up at some location; i.e., conversion to a solid state.

FIG. 2 also reveals the use of a sealing ring 46 adjacent the ink flow transfer path 44 between the intermediate plate 14 and the supply plate 16. FIG. 2 also shows the details of the transducer drive for the ink jet including an elongated transducer member 48 mounted within an elongated opening 50 in the plate 14. The end of the transducer 48 adjacent the chamber 36 abuts a foot 52 for transmitting the movement of the transducer to the chamber 36. The transducer 48 is, of course, driven by a pair of conductors on either side of the member 48. Details concerning such a ink jet chamber may be found in copending application Ser. No. 576,582, filed Feb. 3, 1984 as well as U.S. Pat. No. 4,459,601, and copending application Ser. No. 661,794, filed Oct. 17, 1984, which are assigned to the assignee of this invention and incorporated herein by reference.

Figure 3:
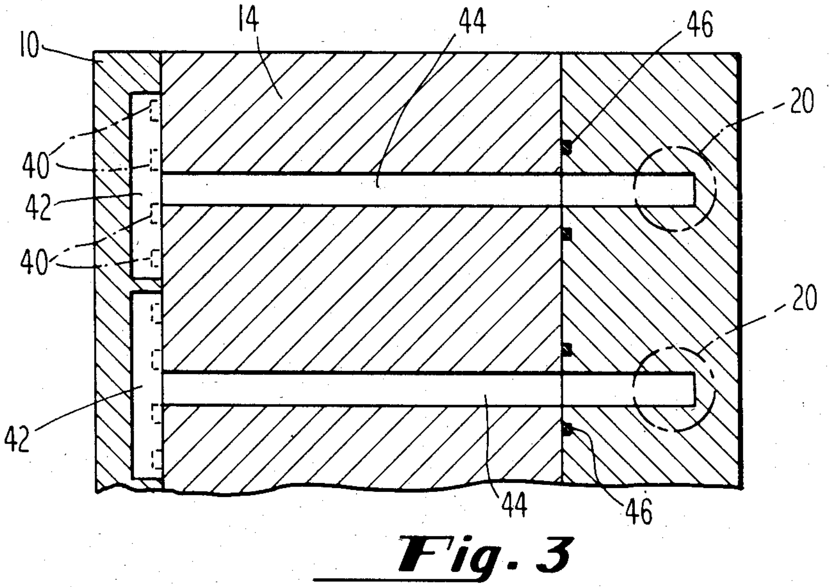
FIG. 3 is a sectional view of the apparatus of FIGS. 1 and 2 taken along line 3—3 of FIG. 2.
Figure 4:
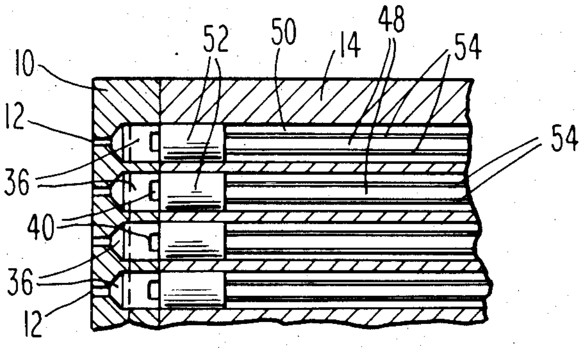
FIG. 4 is a sectional view of the apparatus of FIGS. 1 through 3 taken along line 4—4 of FIG. 2.

Referring to FIGS. 3 and 4, the nature of the array of ink jets depicted in FIG. 1 may be better appreciated. As shown in FIG. 3, a plurality of flow transfer paths 44 are employed where each transfer path 44 supplies a separate plenum 42 coupled to inlets 40 for four separate jets including chamber 36 as depicted in FIG. 4. As also shown in FIG. 4, electrodes 54 are applied to opposite sides of the transducer members 48 so as to permit the application of voltages across the transducers 48.

With the configuration shown in FIGS. 3 through 4, it is possible to employ cartridges 20 which carry ink of different colors in the solid state. As shown in FIG. 1, by utilizing six different cartridges, it is possible to employ six different colors of ink where four jets are associated with each color.

Although a particular embodiment of the invention has been shown and described, it will be understood that other embodiments and modifications will occur to those of ordinary skill in the art which will fall within the true spirit and scope of the invention as set forth in the appended claims.

It will be appreciated that the cartridge 20 may be mounted lower, such that the level of ink always remains below the chamber 36. This assures that all of the ink may be melted at one time without creating a positive head of pressure.

It will be appreciated that the blocks of ink described herein may take a variety of shapes and forms and may be carried in a variety of cartridges as disclosed in copending applications Ser. No. 660,657, filed Oct. 15, 1984, Ser. No. 661,922, filed Oct. 17, 1984, Ser. No. 660,655, filed Oct. 15, 1984, Ser. No. 661,701, filed Oct. 17, 1984, and Ser. No. 661,034, filed Oct. 15, 1984, all of which are assigned to the assignee of this invention and incorporated herein by reference. The preferred ink is described in U.S. Pat. No. 4,390,369 and pending U.S. applications Ser. No. 610,627, filed May 16, 1984, Ser. No. 565,124, filed Dec. 23, 1983 and Ser. No. 644,542, filed Aug. 27, 1984, all of which are assigned to the assignee of this invention and incorporated herein by reference.

We claim:

1. A method of operating an ink jet comprising the following steps:

supporting ink in the solid state in a cartridge;
mounting the cartridge in communication with an ink jet;
melting the ink so as to change the ink from a solid state to a liquid state;
supplying the ink in the liquid state to the ink jet; and
ejecting droplets of ink from the ink jet.

2. The method of claim 1 further comprising the step of establishing a head of ink by melting.

3. The method of claim 1 further comprising the step of melting the ink while the ink is in the cartridge.

4. The method of claim 1 including the step of melting the ink at a melting location and flowing the ink to a supply location.

5. The method of claim 4 wherein there is no substantial temperature gradient between the melting location and the supply location.

6. The method of claim 4 including the step of conducting heat substantially uniformly to the melting location and the supply location.

7. The method of claim 1 wherein the ink is supported in a plurality of cartridges and the plurality of cartridges are mounted in communication with a plurality of ink jets.

8. The method of claim 7 wherein each of said cartridges supplies ink to at least one different ink jet.

9. The method of claim 8 wherein each of said cartridges comprises ink of a different color.

10. The method of claim 7 wherein each of said cartridges is individually removable.

11. A method of operating an ink jet apparatus comprising the following steps:

delivering the ink in a solid state form;
melting the ink so as to change the ink from a solid state to a liquid state;
supplying the ink in the liquid state to ink jet means; and
ejecting droplets of ink from the ink jet means.

12. The method of claim 11 wherein said ink in solid state form is mounted in a cartridge.

13. The method of claim 12 wherein said cartridge is inserted in a receptacle.

14. The method of claim 13 wherein said cartridge is threadedly engaged into the receptacle while said ink is in the solid state.

15. The method of claim 11 including the step of establishing a liquid reserve of ink by melting.

16. The method of claim 11 wherein said ink in solid state form is retained at a melting location and the melted ink drains by gravity from that location.

17. The method of claim 11 including the step of melting the ink at a melting location and flowing the ink to a supply location.

18. The method of claim 17 wherein there is no substantial temperature gradient between the melting location and the supply location.

19. The method of claim 17 including the step of conducting heat substantially uniformly to the melting location and the supply location.

20. The method of claim 11 wherein said ink in solid state comprises a block supported in communication with and supplies ink to a plurality of ink jets.

21. The method of claim 20 including more than one said block and each said block supplies ink to a different ink jet.

22. The method of claim 21 wherein each said block supplies a plurality of ink jets.

23. The method of claim 21 wherein each said block comprises ink of a different color.

24. The method of claim 21 wherein each of said block is individually removable.

25. An ink jet apparatus comprising:
an ink jet including a chamber, an orifice and an inlet;
an ink supply coupled to said ink jet;
cartridge means for supporting ink in a solid state; and
heater means coupled to said cartridge means and said supply means, said heater means melting said ink in said solid state and maintaining said ink in said supply in the liquid state.

26. The apparatus of claim 25 wherein said apparatus comprises a receptacle receiving said cartridge, said heater means being thermally coupled to said receptacle for heating said cartridge.

27. The apparatus of claim 25 wherein the ink contained within said cartridge in the solid state is substantially cylindrical.

28. The apparatus of claim 27 further comprising a receptacle receiving said cartridge, said heater means being thermally coupled to said receptacle for heating said cartridge.

29. The apparatus of claim 25 wherein said cartridge comprises a substantially tubular member.

30. The apparatus of claim 29 further comprising a receptacle engaging said tubular member.

31. The apparatus of claim 25 wherein said ink supply comprises reservoir means coupled to said ink jet, said reservoir means being in substantial thermal communication with said ink jet.

32. The apparatus of claim 31 wherein said reservoir is coupled to said ink jet through a transfer flow path coupled to said heater means.

33. The apparatus of claim 31 wherein said reservoir comprises a heat conductive material.

34. The apparatus of claim 32 wherein said heater means comprises a plate communicating with said reservoir means, said cartridge, said transfer flow path and said ink jet.

35. The apparatus of claim 34 wherein said reservoir means, said transfer flow path, said cartridge and said ink jet comprises at least one plate of heat conductive material.

36. An ink jet apparatus comprising:
ink jet means including a chamber, an orifice and an inlet;
removable means for containing at least one preformed block of ink in a solid state;
means for heating said block so as to melt said ink to a liquid state; and
means for supplying ink in the liquid state to said ink jet means.

37. The ink jet apparatus of claim 36 wherein:
said ink jet means comprises a plurality of ink jets; and
said means for containing comprises a plurality of individual containers, each of said containers comprising at least one of said block of ink.

38. The ink jet apparatus of claim 37 wherein said means for supplying couples the melted ink for each of said containers to at least one of said ink jets.

39. The ink jet apparatus of claim 37 wherein ink in said different containers comprises different colors and said different containers are coupled to different ink jets.

40. A hot melt ink removable cartridge for use in an ink jet apparatus comprising:
container means;
hot melt ink in solid form at room temperature located within said container means;
said container means including means adapted to engage and disengage said ink jet apparatus.

41. The hot melt ink of claim 40 when said container means is cylindrical.

42. A method of operating an ink jet comprising the following steps:
supporting ink in the solid state in a cartridge having an opening in at least one extremity;
mounting the cartridge in a receptacle in communication with a reservoir below while the ink remains in the solid state with ink in the solid state directly exposed to said reservoir below through said opening;
melting the ink so as to change the ink from said solid state to a liquid state;
supplying the ink in the liquid state to the ink jet; and
ejecting droplets of ink from the ink jet.

43. The method of claim 42 wherein the ink is melted while within the cartridge.

44. A method of operating an ink jet apparatus comprising a receptacle for receiving solid state ink and a reservoir coupled to said receptacle for ink which has been melted from the solid state to the liquid state, and an impulse ink jet, said method comprising the following steps:
delivering said solid state ink to said receptacle;
heating said receptacle while said solid state ink is retained in said receptacle;
melting said solid state ink in said receptacle during said heating;
supplying said reservoir with liquid state ink for said receptacle; and
supplying said ink jet with liquid state ink from said reservoir.

45. The method of claim 44 wherein said step of supplying said reservoir includes the step of draining the melted liquid state ink from the receptacle into the reservoir under the influence of gravity.

46. The method of claim 44 wherein said solid state ink delivered to said receptacle is substantially cylindrical.

47. A method of operating an ink jet apparatus comprising a receptacle for receiving solid state ink, a reservoir coupled to said receptacle receiving ink which has been melted so as to change from the solid state to the liquid state and an impulse ink jet, said method comprising the following steps:
delivering a block of solid state ink to said receptacle at room temperature;

heating said receptacle while said solid state ink is retained in said receptacle;

melting said solid state ink during heating of said receptacle so as to create liquid state ink in the receptacle;

draining the liquid state ink from said receptacle into said reservoir under the influence of gravity;

collecting liquid state ink in the reservoir; and supplying liquid state ink to the ink jet from the reservoir.

48. The method of claim 47 wherein the block of solid state ink delivered to the receptacle is substantially cylindrical.

49. The method of claim 44 or 45 wherein said solid state ink comprises a block, said method further comprising the step of inserting said block into said receptacle through an opening having the same shape as said block.

50. The method of claim 49 wherein said block is substantially cylindrical and said opening is circular.

51. The method of claim 49 further comprising the step of conducting heat substantially uniformly to said reservoir and said receptacle.

52. The method of claim 44 including the step of ejecting ink from said ink jet on demand.

53. The method of claim 52 including the step of establishing a liquid head in said reservoir below said ink jet.

54. The method of claim 47 wherein said solid state ink comprises a block, said method further comprising the step of inserting said block into said receptacle through an opening having the same shape as said block.

55. The method of claim 54 wherein said block is substantially cylindrical and said opening is substantially circular.

56. The method of claim 54 further comprising the step of conducting heat substantially uniformly to said reservoir and said receptacle.

57. The method of claim 54 including the step of ejecting ink from said ink jet on demand.

58. The method of claim 57 including the step of establishing a liquid in said reservoir below said ink jet.

59. A method of operating an ink jet apparatus comprising a plurality of receptacles for receiving solid state ink of different colors, a plurality of reservoirs respectively coupled to said receptacles for ink which has been melted from the solid state to the liquid state, and a plurality of impulse ink jets respectively coupled to said plurality of reservoirs, said method comprising the following steps:

delivering solid state ink of different colors respectively to each of said plurality of receptacles;

heating each of said receptacles while said solid state ink of different colors is respectively retained in said plurality of receptacles;

melting said solid state ink of different colors respectively in each of said plurality of receptacles;

supplying said plurality of reservoirs respectively with melted ink of different colors;

supplying said plurality of ink jets respectively with melted ink of different colors from said plurality of reservoirs; and ejecting droplets of ink from said ink jets on demand.

60. The method of claim 59 wherein said solid state ink of different colors comprises a plurality of blocks, said method comprising the step of inserting said blocks into each of said receptacles through an opening having the same shape as each of said blocks.

61. The method of claim 59 wherein said apparatus comprises a plurality of sets of ink jets for ejecting ink of each of said colors, said melted ink of each of said colors being supplied to each of said sets of jets.

* * * * *

US004631557B1

REEXAMINATION CERTIFICATE (3396th)

United States Patent [19]

[11] B1 4,631,557

[45] Certificate Issued Dec. 16, 1997

Cooke et al.

[54] INK JET EMPLOYING PHASE CHANGE INK AND METHOD OF OPERATION

[75] Inventors: Theodore M. Cooke, Danbury; William J. DeBonte, Kent, both of Conn.

[73] Assignee: Data Products Corporation, Del.

Reexamination Request:
No. 90/002,125, Sep. 6, 1990

Reexamination Certificate for:

| | |
|---|---|
| Patent No.: | **4,631,557** |
| Issued: | **Dec. 23, 1986** |
| Appl. No.: | **660,656** |
| Filed: | **Oct. 15, 1984** |

[51] Int. Cl.$^{6}$ .................................. B41J 2/04; B41J 2/17

[52] U.S. Cl. .................................................. 347/88; 347/88

[58] Field of Search ............................. 346/140; 400/424

[56] References Cited

U.S. PATENT DOCUMENTS

| | | | |
|---|---|---|---|
| D. 279,581 | 7/1985 | Juliana et al. | D18/22 |
| 402,374 | 4/1889 | Williams . | |
| 951,323 | 3/1910 | Mathewson . | |

(List continued on next page.)

FOREIGN PATENT DOCUMENTS

| | | |
|---|---|---|
| 0097823 | 1/1984 | European Pat. Off. . |
| 0099682 | 2/1984 | European Pat. Off. . |
| 0037195 | 6/1984 | European Pat. Off. . |
| 0123523 | 10/1984 | European Pat. Off. . |
| 0147257 | 7/1985 | European Pat. Off. . |
| 0152247 | 8/1985 | European Pat. Off. . |
| 0181198 | 5/1986 | European Pat. Off. . |
| 0206286 | 12/1986 | European Pat. Off. . |
| 1446176 | 11/1966 | France . |
| 2183873 | 12/1973 | France . |
| 2329445 | 10/1975 | France . |
| 2450276 | 1/1980 | France . |
| 2441478 | 6/1975 | Germany . |
| 2753816 | 6/1978 | Germany . |
| 2812562 | 9/1979 | Germany . |
| 2101864 | 7/1992 | Germany . |
| 49-80708 | 8/1974 | Japan . |
| 53-95027 | 1/1977 | Japan . |
| 5395027 | 8/1978 | Japan . |
| 53128053 | 4/1980 | Japan . |
| 55-54368 | 4/1980 | Japan . |
| 55-84670 | 6/1980 | Japan . |
| 55-84670 | 7/1980 | Japan . |
| 55-11346 | 2/1981 | Japan . |
| 56-55468 | 5/1981 | Japan . |
| 56-113462 | 9/1981 | Japan . |
| 56-113472 | 9/1981 | Japan . |
| 59-11372 | 9/1981 | Japan . |
| 56-129274 | 10/1981 | Japan . |
| 56-166274 | 12/1981 | Japan . |
| 57-23665 | 2/1982 | Japan . |
| 57-49072 | 10/1982 | Japan . |
| 58-116162 | 7/1983 | Japan . |
| 58-208062 | 12/1983 | Japan . |
| 56-89161 | 5/1984 | Japan . |
| 59-87162 | 5/1984 | Japan . |
| 60-90775 | 5/1985 | Japan . |
| 648738 | 1/1951 | United Kingdom . |
| 1424722 | 2/1976 | United Kingdom . |
| 2111523 | 7/1983 | United Kingdom . |

OTHER PUBLICATIONS

Owens, "New Ink-Writing Methods For Graphic Recording," Instruments & Control Systems, vol. 38, pp. 100–102, Jul. 19656.

Lloyd Owens, "New Ink-Writing Methods for Graphic Recording", Instruments and Control Systems, vol. 38, Jul. '65 pp. 100–102.

(List continued on next page.)

*Primary Examiner*—Mark Reinhart
*Attorney, Agent, or Firm*—Spensley Horn Jubas & Lubitz

[57] ABSTRACT

A demand ink jet employs removable cartridges of hot melt ink. When the temperature of the ink within the cartridge is raised, the ink melts and drains from the cartridge into the supply system. Each of the cartridges may include ink of a different color so as to permit multi-color printing.

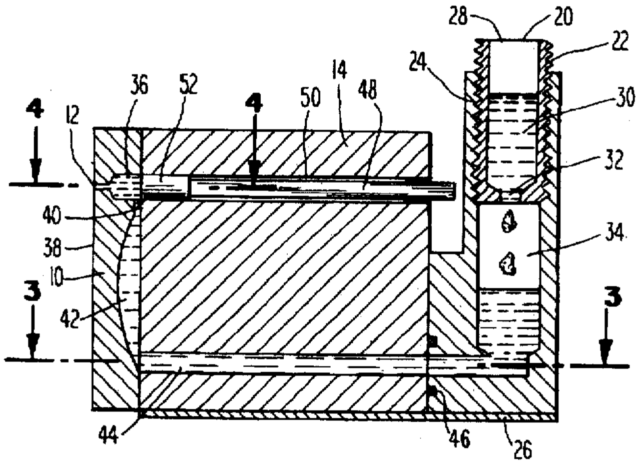

U.S. PATENT DOCUMENTS

| | | | |
|---|---|---|---|
| 1,066,758 | 7/1913 | Ruder . | |
| 1,327,058 | 1/1920 | Ogden . | |
| 1,449,864 | 3/1923 | Lillis . | |
| 1,609,244 | 11/1926 | Goodyer et al. . | |
| 1,986,658 | 1/1935 | Witter . | |
| 2,351,432 | 6/1944 | Jennings et al. . | |
| 2,426,248 | 8/1947 | Sugarman . | |
| 2,595,456 | 5/1952 | Hinkel . | |
| 2,773,496 | 12/1956 | Czarnecki . | |
| 2,890,125 | 6/1959 | Mange . | |
| 3,012,373 | 12/1961 | Willis . | |
| 3,046,556 | 7/1962 | Summers, Jr. et al. | 346/140 |
| 3,171,371 | 3/1965 | Gray . | |
| 3,230,106 | 1/1966 | West . | |
| 3,247,519 | 4/1966 | Sihvonen . | |
| 3,282,709 | 11/1966 | Ehrhardt et al. . | |
| 3,282,853 | 11/1966 | Bennett . | |
| 3,318,481 | 5/1967 | Phillips et al. . | |
| 3,330,673 | 7/1967 | Voet et al. . | |
| 3,353,974 | 11/1967 | Trimble et al. . | |
| 3,369,253 | 2/1968 | Sihvonen . | |
| 3,411,675 | 11/1968 | Wahl . | |
| 3,412,707 | 11/1968 | West . | |
| 3,421,910 | 1/1969 | Gilson et al. . | |
| 3,585,361 | 6/1971 | Rosen . | |
| 3,593,661 | 7/1971 | Tripp . | |
| 3,596,285 | 7/1971 | Gottwald | 346/75 |
| 3,653,932 | 4/1972 | Berry et al. | 106/22 |
| 3,680,736 | 8/1972 | Viessmann | 221/14 |
| 3,715,219 | 2/1973 | Kurz et al. . | |
| 3,761,953 | 9/1973 | Helgeson et al. | 346/75 |
| 3,771,165 | 11/1973 | Kurimoto et al. | 346/140 |
| 3,773,069 | 11/1973 | Rebentisch . | |
| 3,846,141 | 11/1974 | Ostergren et al. . | |
| 3,853,410 | 12/1974 | Busoni . | |
| 3,893,588 | 7/1975 | Patrick . | |
| 3,961,337 | 6/1976 | Jung et al. | 346/140 R |
| 3,989,569 | 11/1976 | Newman . | |
| 3,994,736 | 11/1976 | Hertz et al. . | |
| 4,005,237 | 1/1977 | Panken . | |
| 4,007,684 | 2/1977 | Takano et al. | 101/366 |
| 4,018,728 | 4/1977 | Priest . | |
| 4,021,252 | 5/1977 | Banczak et al. . | |
| 4,038,297 | 7/1977 | Rodenberg et al. . | |
| 4,066,585 | 1/1978 | Schepp et al. . | |
| 4,069,179 | 1/1978 | Jones . | |
| 4,073,122 | 2/1978 | Areson . | |
| 4,074,284 | 2/1978 | Dexter et al. | 346/140 R |
| 4,095,237 | 6/1978 | Amberntsson et al. | 346/140 R |
| 4,106,030 | 8/1978 | Hampton et al. . | |
| 4,108,671 | 8/1978 | Richlin . | |
| 4,119,034 | 10/1978 | Wax | 101/366 |
| 4,136,076 | 1/1979 | Daniels . | |
| 4,150,997 | 4/1979 | Hayes . | |
| 4,152,986 | 5/1979 | Dadowski et al. . | |
| 4,153,467 | 5/1979 | Yano et al. . | |
| 4,162,501 | 7/1979 | Mitchell et al. | 346/140 R |
| 4,165,399 | 8/1979 | Germonprez . | |
| 4,171,981 | 10/1979 | Austin et al. . | |
| 4,176,361 | 11/1979 | Kawada et al. . | |
| 4,178,595 | 12/1979 | Jinnai et al. . | |
| 4,190,846 | 2/1980 | Yamamoto et al. | 346/140 R |
| 4,197,135 | 4/1980 | Bailey et al. . | |
| 4,215,352 | 7/1980 | Corwin . | |
| 4,218,252 | 8/1980 | Yokoyama . | |
| 4,238,807 | 12/1980 | Bovio | 346/140 PD |
| 4,241,357 | 12/1980 | Anestos | 346/140 R |
| 4,243,994 | 1/1981 | Kobayashi et al. . | |
| 4,248,746 | 2/1981 | Greiner . | |
| 4,250,512 | 2/1981 | Kattner et al. . | |
| 4,251,824 | 2/1981 | Hara et al. . | |
| 4,273,847 | 6/1981 | Lennon et al. . | |
| 4,279,653 | 7/1981 | Makishima et al. . | |
| 4,281,329 | 7/1981 | Yano et al. . | |
| 4,296,421 | 10/1981 | Hara et al. . | |
| 4,303,445 | 12/1981 | Whitfield et al. . | |
| 4,312,009 | 1/1982 | Lange . | |
| 4,320,406 | 3/1982 | Heinzl | 346/140 PD |
| 4,332,946 | 6/1982 | Venkataramu et al. . | |
| 4,337,183 | 6/1982 | Santiago . | |
| 4,343,653 | 8/1982 | Beach et al. . | |
| 4,353,078 | 10/1982 | Lee et al. . | |
| 4,359,744 | 11/1982 | Salmre | 346/1.1 |
| 4,361,843 | 11/1982 | Cooke et al. . | |
| 4,376,283 | 3/1983 | Bower | 346/140 R |
| 4,381,946 | 5/1983 | Uehara et al. . | |
| 4,389,657 | 6/1983 | McMahon . | |
| 4,390,369 | 6/1983 | Merritt et al. . | |
| 4,392,146 | 7/1983 | Bovio | 346/140 PD |
| 4,395,287 | 7/1983 | Kobayashi et al. . | |
| 4,396,429 | 8/1983 | Matsumoto et al. . | |
| 4,400,215 | 8/1983 | Cooke et al. . | |
| 4,409,040 | 10/1983 | Tabayashi et al. . | |
| 4,419,677 | 12/1983 | Kasugayama et al. . | |
| 4,421,559 | 12/1983 | Owatari . | |
| 4,422,085 | 12/1983 | Sumitomo et al. . | |
| 4,426,227 | 1/1984 | Keeling et al. . | |
| 4,443,820 | 4/1984 | Mutoh et al. | 358/296 |
| 4,444,108 | 4/1984 | Jenness, III . | |
| 4,459,601 | 7/1984 | Howkins . | |
| 4,462,035 | 7/1984 | Koto | 346/76 |
| 4,472,537 | 9/1984 | Johnson et al. . | |
| 4,475,113 | 10/1984 | Lee et al. . | |
| 4,475,116 | 10/1984 | Sicking et al. | 346/140 R |
| 4,484,948 | 11/1984 | Merritt et al. . | |
| 4,488,665 | 12/1984 | Cocks et al. . | |
| 4,490,731 | 12/1984 | Vaught | 346/140 PD |
| 4,509,059 | 4/1985 | Howkins . | |
| 4,531,976 | 7/1985 | Lin . | |
| 4,537,631 | 8/1985 | Cooke et al. . | |
| 4,539,568 | 9/1985 | Lewis | 346/140 PD |
| 4,539,570 | 9/1985 | Moore . | |
| 4,541,340 | 9/1985 | Peart et al. . | |
| 4,550,324 | 10/1985 | Tamaru et al. . | |
| 4,559,872 | 12/1985 | Perra, Jr. . | |
| 4,597,794 | 7/1986 | Ohta et al. . | |
| 4,631,557 | 12/1986 | Cooke | 346/140 PD |
| 4,659,383 | 4/1987 | Lin et al. . | |
| 4,758,276 | 7/1988 | Lin et al. . | |
| 4,822,418 | 4/1989 | Lin et al. . | |

OTHER PUBLICATIONS

Sweet, "High-Frequency Oscillography With Electrostatically Deflected Ink Jets," Stanford Electronics, Technical Report No. 1722-1, Mar. 1964.

Hendricks, "Ink Spitter For Hot Melt Ink," IBM Technical Disclosure Bulletin, vol. 26, No. 3A, Aug. 1983.

Abstract No. K5010 C/44 "High speed recording equipment drop genertaor," Oct. 23, 1980.

Abstract No. J3503 C/39 "Ink jet printer with uniform droplets," Apr. 2, 1979.

Abstract No. 35067C/20 "Ink jet recording head—with heating element at junction of liquid inlet and inclined expulsion zone," Dec. 28, 1978.

Abstract No. L6528 C/49 "Print head for ink jet printer," Nov. 27, 1980.

Spectra v. Dataproducts C-90-405-S (N.H.) and Dataproducts v. Spectra C-91-79-5 (N.H.) informal responses to Interrogatories, 8 Mar. 1991.

Romano, "Digital technologies will become more common-place in various graphic operations," American Printer And Lithographer, p. 58, Nov. 1979.
"It's Sunnyside Up For Ink Jet Printing," American Printer And Lithographer, pp. 56–58, Sep. 1980.
Sweet, "High–Frequency Recording With Electrostatically Deflected Ink Jets," The Review Of Scientific Instruments, vol. 36, No. 2, pp. 131–136, Feb. 1965.
Abstract No. 702458/39 "Ink for hot ink jet recording process," Mar. 3, 1978.
Abstract No. J55145–774 "Low softening point ink for ink jet recording," May 2, 1979.
Abstract No. 77/17,758 "Magnetic Ink Jet Printing Process," Sep. 9, 1978.
Abstract No. 80083B/44 "Recording medium for ink jet recording process," Mar. 15, 1978.
Abstract No. 107587 "Inks for ink–jet recording," May 17, 1974.
Abstract No. 06955B/04 "Oily ink compsn. for stamping, recording, jet printing, etc.," May 18, 1977.
Abstract No. 43987C/25 "Non–impact recording process," Oct. 31, 1978.
Abstract No. 45784C/26 "Quick–drying ink for ink jet recording," Nov. 10, 1978.
Abstract No. 47097C/27 "Quick drying ink for ink jet recording," Nov. 13, 1978.
Abstract No. 89298X/48 "Ink compsns. for ink injection type recording appts.," Nov. 28, 1973.
Abstract No. 95:229337 "Preparation of hectragraphic plates," 74–Radiation Chem., Photochem., vol. 95, p. 643 (1981).
The Condensed Chemical Dictionary, 10th Edition, p. 98 (1981).
Bennett, H., "Industrial Waxes," vol. 1 (Chapters 1, 2, 10, 11) and vol. 2 (Chapter 2, pp. 81–91, 167–173, 236–237), Chemical Publishing Co., Inc., New York (1975).
CRC Handbook of Chemistry and Physics, p. C–283, 1979–80 Edition.
IBM Disclosure Bulletin vol. 26, No. 3, Aug. 1983.
"New Ink Writing Methods for Graphic Recording" Owens, 196.
*Pictorial Handbook of Technical Devices*, Paul Grafstein, 1971, pp. 176–187.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 2, 5, 6, 25 to 39, 42 and 43 is confirmed.

Claims 1, 3, 4, 7 to 24, 40, 41 and 44 to 61 are cancelled.

New claims 62, 63, 64, 65, 66 and 67 are added and determined to be patentable.

*62. A method of operating an ink jet comprising the following steps:*

*supporting ink in a solid state form in cooperation with a carrying device;*

*positioning the carrying device in a cooperative position with respect to a receptacle in communication with a reservoir below while the ink remains in the solid state;*

*melting the ink so as to change the ink from said solid state to a liquid state;*

*supplying the ink in the liquid state to the ink jet; and*

*ejecting droplets of ink from the ink jet.*

*63. A method of operating an ink jet apparatus comprising a plurality of ink jets, a receptacle for receiving ink in a solid state form and means for coupling the receptacle to said ink jet, said method comprising the following steps;*

*delivering the ink in a solid state form comprising a block to said receptacle so as to be supported in communication with the plurality of ink jets;*

*melting the ink so as to change the block from a solid state to a liquid state;*

*supplying the ink in the liquid state to the plurality of ink jets through said coupling means; and*

*ejecting droplets from the plurality of ink jets;*

*wherein said method further comprises delivering more than one said block, each said block supplying ink to a different ink jet;*

*wherein each said block supplies a plurality of ink jets; and wherein each said block is individually removable prior to melting.*

64. A method of operating an ink jet apparatus comprising an ink jet device, said method comprising the following steps;

*delivering the ink to a delivery location in the apparatus in a solid state form in a carrying device;*

*melting the ink at the delivery location so as to change the ink from a solid state to a liquid state;*

*supplying the ink in a liquid state to the ink jet device; and*

*ejecting droplets of ink from the ink jet device.*

*65. The method of claim 64 wherein the carrying device engages the apparatus at the time of delivering the ink.*

*66. A method of operating an ink jet apparatus comprising the following steps:*

*delivering the ink in a solid state form;*

*melting the ink at a melting location so as to change the ink from a solid state to a liquid state;*

*flowing the ink to a supply location wherein there is no substantial temperature gradient between the melting location and the supply location;*

*supplying the ink in the liquid state to ink jet means; and*

*ejecting droplets of ink from the ink jet means.*

*67. The method of claim 66 including the step of conducting heat substantially uniformly to the melting location and the supply location.*

* * * * *